S. G. MAUS.
Burial-Vault.

No. 213,121. Patented Mar. 11, 1879.

Witnesses:
W. B. Masson
F. L. Hamilton

Inventor:
Samuel G. Maus
by H. H. Bliss
atty.

UNITED STATES PATENT OFFICE.

SAMUEL G. MAUS, OF LEWISBURG, PENNSYLVANIA.

IMPROVEMENT IN BURIAL-VAULTS.

Specification forming part of Letters Patent No. 213,121, dated March 11, 1879; application filed January 28, 1879.

*To all whom it may concern:*

Be it known that I, SAMUEL G. MAUS, of Lewisburg, in the county of Union and State of Pennsylvania, have invented certain new and useful Improvements in Sarcophagi and Burial-Vaults; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to improvements in the construction of burial-vaults, its purpose being to construct a vault with but little expense, which shall be durable, water and air tight, and proof against attempts to remove the body therefrom.

It consists in combining walls of masonry and walls of cement in such manner as to form a hard and impervious casing around the burial-casket.

Figure 1:
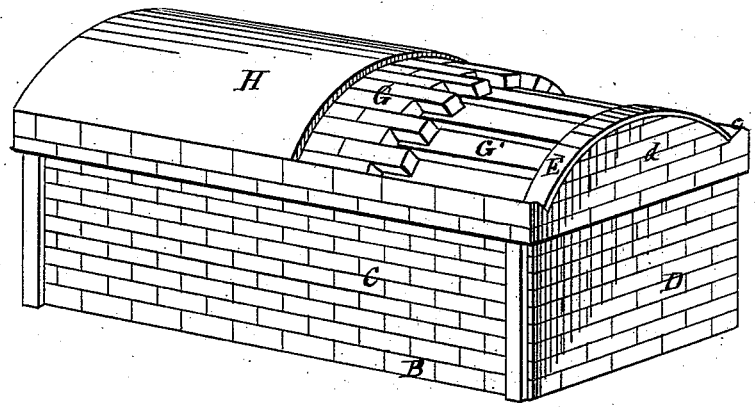
Figure 2:
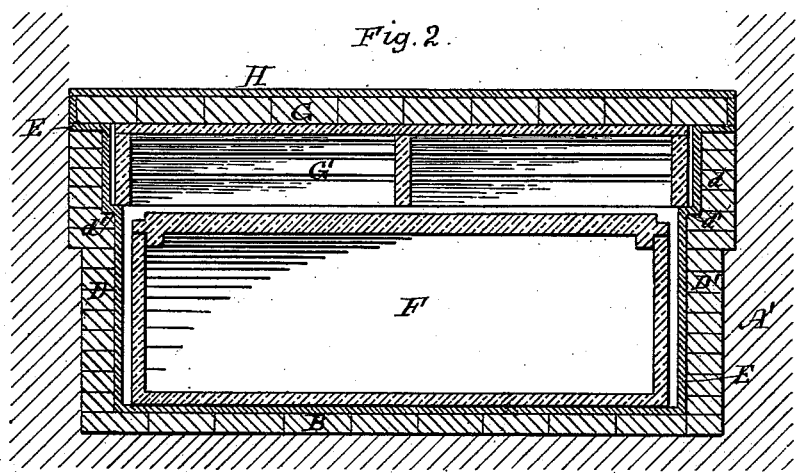
Figure 3:
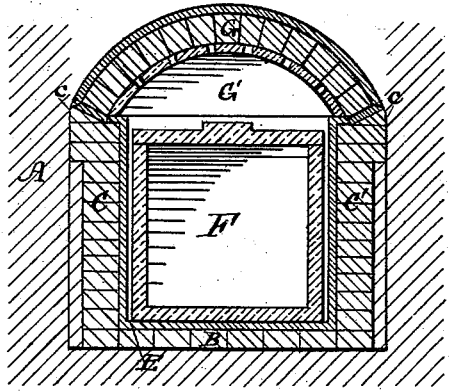

Figure 1 is a perspective view of my improved vault, partly shown in broken lines. Fig. 2 is a longitudinal vertical section. Fig. 3 is a vertical transverse section.

In the drawings, A represents the side wall, and A' the end wall, of the grave or excavation in which the vault is constructed. This excavation may be of any convenient or desired depth, though I prefer to sink it to a depth of at least six feet.

The vault is prepared by building up the side walls C C' and the end walls D D' with brick, laid in cement or mortar, which walls are carried up to any suitable point. A layer of cement is applied to the outside of the side and end walls, after which the earth is filled and packed behind the walls up to within a few inches of the top. An abutment is then formed level with the top of the wall, preferably by laying brick edgewise back of the wall, and adapted to support the skewback, as at *c c*, and the end centers *d d*. The bottom is then paved with bricks and cement or mortar, as shown at B, and the skewbacks *c c* and centers *d d* formed as shown in Figs. 1 and 3, leaving an offset, *d'*. After these parts have been prepared a heavy coating or wall of cement is laid on the inside of the ends D D, the sides C C, the bottom B, and the parts *c c* and *d d*.

Within the tight chamber that is thus formed is placed the casket containing the corpse, either by itself or inclosed in the box F, ordinarily employed. After the casket has been introduced a wooden support, G', is placed over it, so as to rest on the offsets at *d' d'*. Upon this support G' is then laid the covering-arch G, of masonry and cement, thus closing the vault. After the arch is completed a thick layer of cement, H, is placed upon the top.

It will be readily seen that I thus construct a vault which is at all points absolutely impervious to water, as the cement ceiling H and the arch G prevent the passage of any water downward, and the cement walls E E prevent its passage upward or inward.

After the cement has become hard it is found that it is practically impossible to break open a vault constructed as above described with any of the implements ordinarily employed by those who open graves to remove their contents, the wooden support G' assisting to prevent the pushing in of the top.

I am aware that vaults have been constructed of artificial stone, and of concrete molded or formed over iron or wooden supports, and I do not claim such constructions as my invention; but I have found that these constructions necessitate the use of very expensive materials, which cannot be readily procured at all times and places, and which require much skill and care in manipulating, whereas the brick and mortar or cement necessary to carry out my invention are immediately available to all, and by combining them as described the respective walls of brick and of cement are made to interact, so that the brick chamber, besides being itself largely impervious and impregnable, supports the cement chamber, which latter, in turn, assists the brick to render the whole structure proof against water and ordinary blows.

What I claim as my invention, and desire to secure by Letters Patent, is—

A burial-vault constructed in a grave or excavation in a manner substantially as set forth—that is to say, with the bottom B and the walls C C' D D' of masonry, the cement walls E, the arch G, and the cement ceiling H.

In testimony that I claim the foregoing as my own I affix my signature in presence of two witnesses.

SAML. G. MAUS.

Witnesses:
    NORMAN BALLS,
    SCOTT CLINGAN.